(12) United States Patent
Dickinson et al.

(10) Patent No.: US 12,006,966 B2
(45) Date of Patent: Jun. 11, 2024

(54) FASTENER CLIP ASSEMBLY WITH LOCKING ARMS

(71) Applicant: Termax Company, Lake Zurich, IL (US)

(72) Inventors: Daniel James Dickinson, Lincolnshire, IL (US); David Friesorger, McHenry, IL (US)

(73) Assignee: TERMAX COMPANY, Lake Zurich, IL (US)

( * ) Notice: Subject to any disclaimer, the term of this patent is extended or adjusted under 35 U.S.C. 154(b) by 0 days.

(21) Appl. No.: 18/106,991

(22) Filed: Feb. 7, 2023

(65) Prior Publication Data

US 2023/0220861 A1 Jul. 13, 2023

Related U.S. Application Data

(63) Continuation-in-part of application No. 17/518,503, filed on Nov. 3, 2021, now Pat. No. 11,773,887.

(60) Provisional application No. 63/314,474, filed on Feb. 27, 2022, provisional application No. 63/113,447, filed on Nov. 13, 2020.

(51) Int. Cl.
*F16B 5/06* (2006.01)
*F16B 21/06* (2006.01)

(52) U.S. Cl.
CPC ............ *F16B 5/0657* (2013.01); *F16B 5/065* (2013.01); *F16B 21/065* (2013.01)

(58) Field of Classification Search
CPC .... F16B 5/0657; F16B 21/078; F16B 21/075; F16B 19/1081; F16B 21/16; F16B 5/065; F16B 21/065; F16B 21/086; B62D 27/06; B60R 13/0243; B60R 13/0206

See application file for complete search history.

(56) References Cited

U.S. PATENT DOCUMENTS

| | | | | |
|---|---|---|---|---|
| 4,850,773 A * | 7/1989 | Asami | ...................... | F16B 21/06 411/908 |
| 4,874,276 A * | 10/1989 | Iguchi | ................. | F16B 19/1081 D8/382 |
| 5,641,255 A * | 6/1997 | Tanaka | ................ | F16B 19/1081 411/48 |
| 5,775,861 A * | 7/1998 | Leon | ........................ | F16B 5/065 411/908 |
| 6,264,393 B1 * | 7/2001 | Kraus | .................... | F16B 5/0657 24/297 |
| 6,749,157 B2 * | 6/2004 | Takeuchi | .................. | H02G 3/32 248/71 |
| 7,374,200 B2 * | 5/2008 | Ikeda | ..................... | F16B 21/075 280/730.2 |

(Continued)

*Primary Examiner* — Robert Sandy
*Assistant Examiner* — Rowland Do (57) ABSTRACT

A system and method including a fastener clip including a top portion and a bottom portion. The bottom portion includes a platform, a pair of locking arms and a pair of feet. The pair of locking arms is coupled to the platform via a pair of hinges. The pair of feet is coupled to the locking arms and is being configured to rotate with the locking arms. The feet are configured to be partially inserted into a slot in a doghouse and, based at least on the locking arms being rotated, the feet are configured to rotate into the slot in the doghouse and to couple the bottom portion to the doghouse. The locking arms are configured to be coupled to the platform at the end of the rotation.

14 Claims, 7 Drawing Sheets

(56) References Cited

U.S. PATENT DOCUMENTS

| | | | | |
|---|---|---|---|---|
| 7,523,898 | B1* | 4/2009 | Barry | F16L 3/243 |
| | | | | 174/164 |
| 8,650,722 | B2* | 2/2014 | Hosoya | B60R 13/0206 |
| | | | | 24/292 |
| 9,062,696 | B2* | 6/2015 | Demerath | F16B 5/0685 |
| 9,453,523 | B2* | 9/2016 | Maschat | F16B 2/243 |
| 9,500,210 | B2* | 11/2016 | Johnson | F16B 5/06 |
| 10,590,968 | B2* | 3/2020 | Benedetti | F16B 21/075 |
| 11,401,963 | B2* | 8/2022 | Lee | F16B 21/075 |
| 2005/0271492 | A1* | 12/2005 | Jackson, Jr. | F16B 21/076 |
| | | | | 411/112 |
| 2007/0217890 | A1* | 9/2007 | Scroggie | F16B 5/123 |
| | | | | 411/508 |
| 2008/0066266 | A1* | 3/2008 | Scroggie | B60R 13/0206 |
| | | | | 24/297 |
| 2009/0263210 | A1* | 10/2009 | Loewe | F16B 19/1081 |
| | | | | 411/553 |
| 2010/0162537 | A1* | 7/2010 | Shiba | F16B 5/065 |
| | | | | 24/458 |
| 2014/0050548 | A1* | 2/2014 | Loewe | F16B 5/0657 |
| | | | | 411/48 |
| 2015/0211565 | A1* | 7/2015 | Benedetti | F16B 21/075 |
| | | | | 24/292 |
| 2016/0114738 | A1* | 4/2016 | Klein | F16B 5/065 |
| | | | | 24/292 |
| 2017/0051780 | A1* | 2/2017 | Dickinson | F16B 21/076 |
| 2019/0186523 | A1* | 6/2019 | Heinrichs | F16B 21/082 |
| 2021/0010500 | A1* | 1/2021 | Rassam | F16B 5/0657 |

* cited by examiner

FASTENER CLIP ASSEMBLY WITH LOCKING ARMS

A. BACKGROUND

The invention relates generally to devices for fastening together two or more objects. A number of devices and fasteners are currently available for fastening objects, such as body panels and automobile interior trim piece panels to the chassis of a vehicle, for example. In some embodiments, a body panel may refer to, for example, any interior or exterior body panel on a vehicle, a plastic interior trim piece, headliner, or any interior trim piece. Additionally, the panel may be any suitable exterior body panel, such as a fender, bumper, quarter panel, or door panel. The chassis of the vehicle may include any substrate, plate, body panel, structural framework, chassis component or subcomponent, wall, or any suitable object.

B. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

Figure 1:
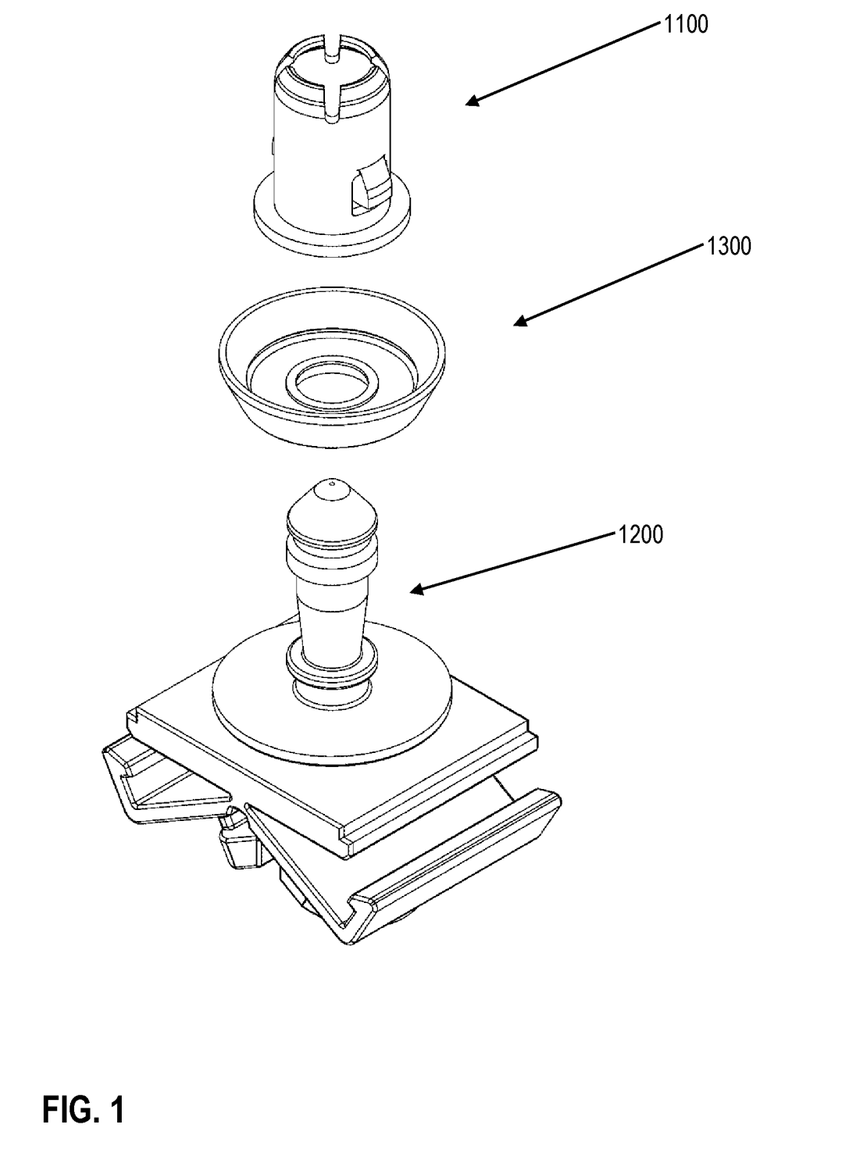
FIG. 1 is an exploded view of a fastener clip assembly, in accordance with some embodiments.

FIG. 1 is an exploded view of a fastener clip assembly, in accordance with some embodiments.

Figure 2:
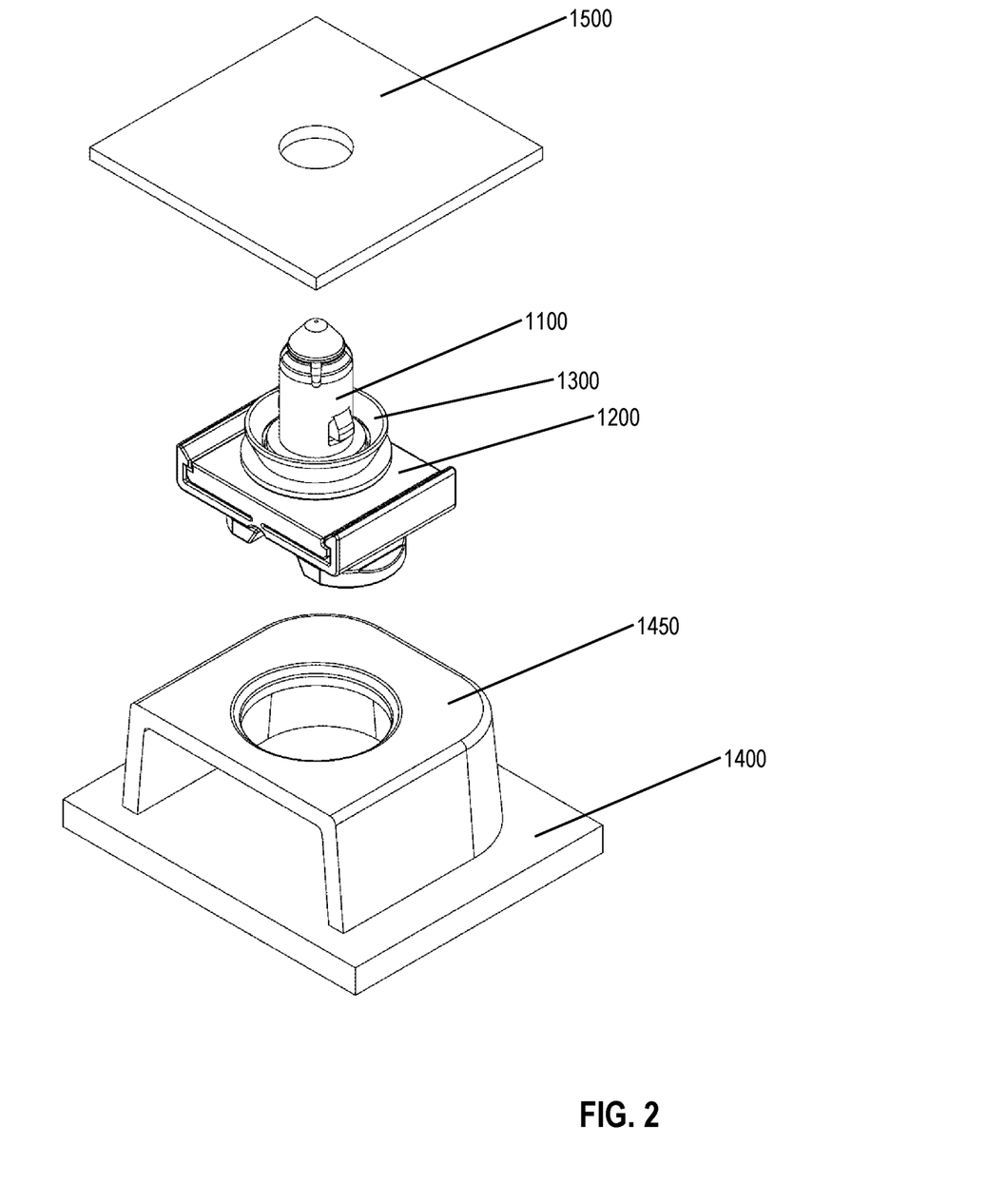
FIG. 2 is an exploded view of a fastener clip assembly, a body panel, and a chassis, in accordance with some embodiments.

FIG. 2 is an exploded view of a fastener clip assembly, a body panel, and a chassis, in accordance with some embodiments.

In some embodiments, the fastener clip assembly comprises cap/grommet 1100 and pin/pin retainer 1200. Pin 1200 is configured to engage and secure itself on cap 1100 based at least upon cap 1100 being configured to fit over pin 1200 and into an interlocked position for the pin and the cap.

The cap/pin assembly may be configured to attach to a slot/hole in chassis 1500 on one end by attaching the cap to the chassis slot and the pin to the cap, for example. On the other end, the assembly may be configured to attach to a doghouse or similar object in panel 1400. Pin 1200 may be configured to be coupled to a doghouse by being pressed into a slot in doghouse 1450 of panel 1400, for example. In some embodiments, the doghouse may be coupled to panel 1400 by various means such as an adhesive, the doghouse may be molded onto panel 1400, etc.

In some embodiments, the two-piece assembly may be configured to retain various trim panels (such as panel 1400) to a car chassis (such as chassis 1500), for example, based at least upon the two-piece assembly being configured to couple to both the panel and the chassis. It should be noted that the fastener clip assembly may be configured to join various other comparable pairs of objects to each other.

In some embodiments, optional seal component 1300 is configured to attach over pin 1200 and to form a seal against the surface of chassis 1500 when the pin/cap assembly is attached to chassis 1500. In some embodiments, forming a seal against chassis surface 1500 prevents water, dirt, and other debris from entering through the chassis slot from the outside to the inside of the chassis. In some embodiments, choosing whether to use seal component 1300 may depend on the environment (such as the amount of water, dirt, etc. present).

It should be noted that multiple other structures and methods may be used for connecting the clip assembly to a chassis. The cap/pin, as shown and discussed here, are only one example of how to connect the fastener clip assembly to a chassis. Other types of fastener clip connections may be used and may connect to other types and shapes of slots in the chassis.

Figure 3:
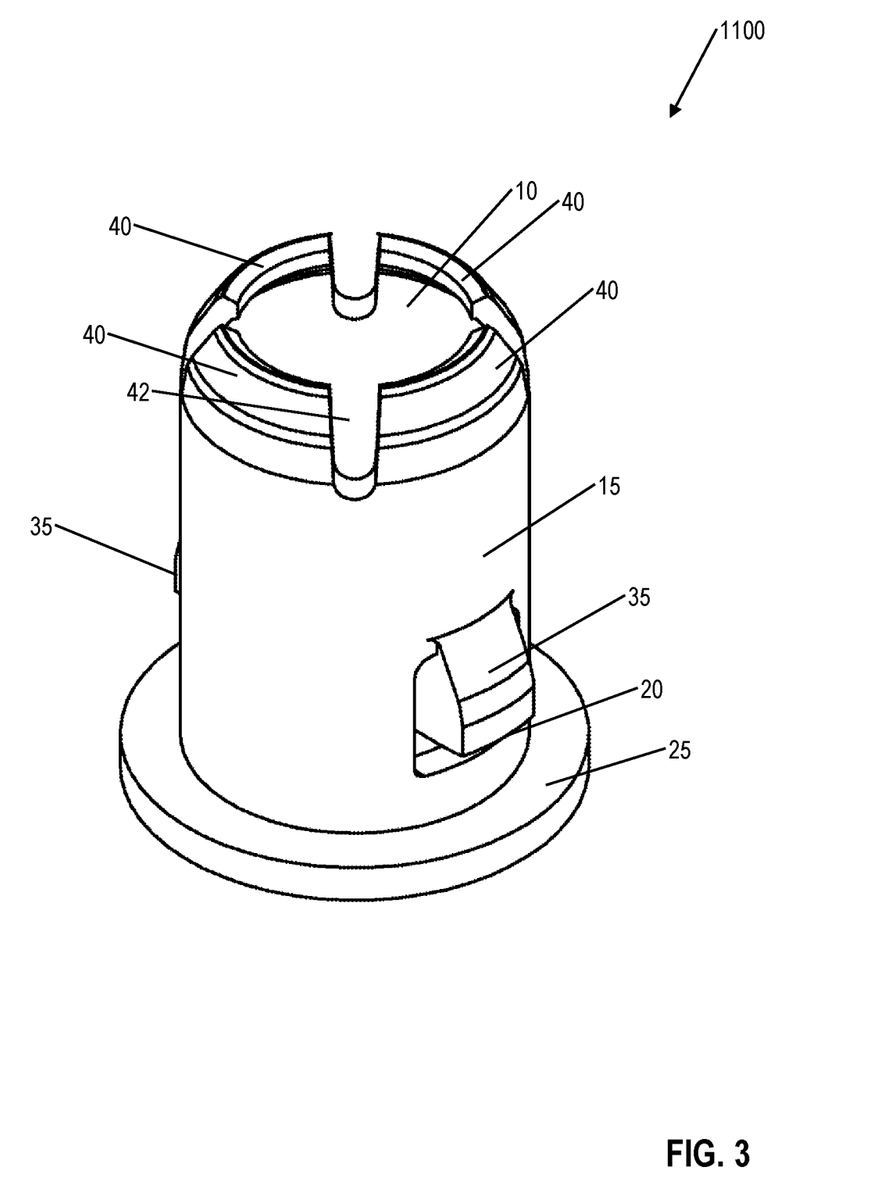
FIG. 3 is a view of a cap of a fastener clip assembly, in accordance with some embodiments.

FIG. 3 is a view of a cap of a fastener clip assembly, in accordance with some embodiments.

As was previously noted, the pin/cap shown here is only one example of a structure/method to couple the fastener clip to the chassis.

In some embodiments, cap 1100 is configured to be interlocked with pin 1200, and the two-part assembly is configured to engage and attach to a slot in a chassis and in addition engage and attach to a panel.

In some embodiments, cap 1100 comprises top portion 10 from which cylinder 15 extends, ending in cap foot 25.

Cap 1100 may also include four crown portions 40 near top portion 10. Crown portions 40 are configured to bend and then snap back into position as the head of pin 1200 is inserted into cap 1100. Crown portions 40 are configured to engage a bottom surface of the head of the pin to lock the pin to the cap once the pin is inserted into the cap.

In some embodiments, small slots 42 may be placed between crown portions 40. The small slots may be configured to facilitate the bending of crown portions 40, such that the crown portions 40 can bend enough to allow for the engagement of the head of pin 1200.

In some embodiments, cap 1100 includes one or more tabs 35 (two are present in the shown embodiment) that are configured to collapse as cap 1100 is pushed into a slot in a chassis and then expand again on the other side of the chassis slot. The bottom sides 20 of tabs 35 are configured to secure cap 1100 to the slot in the chassis.

Figure 4:
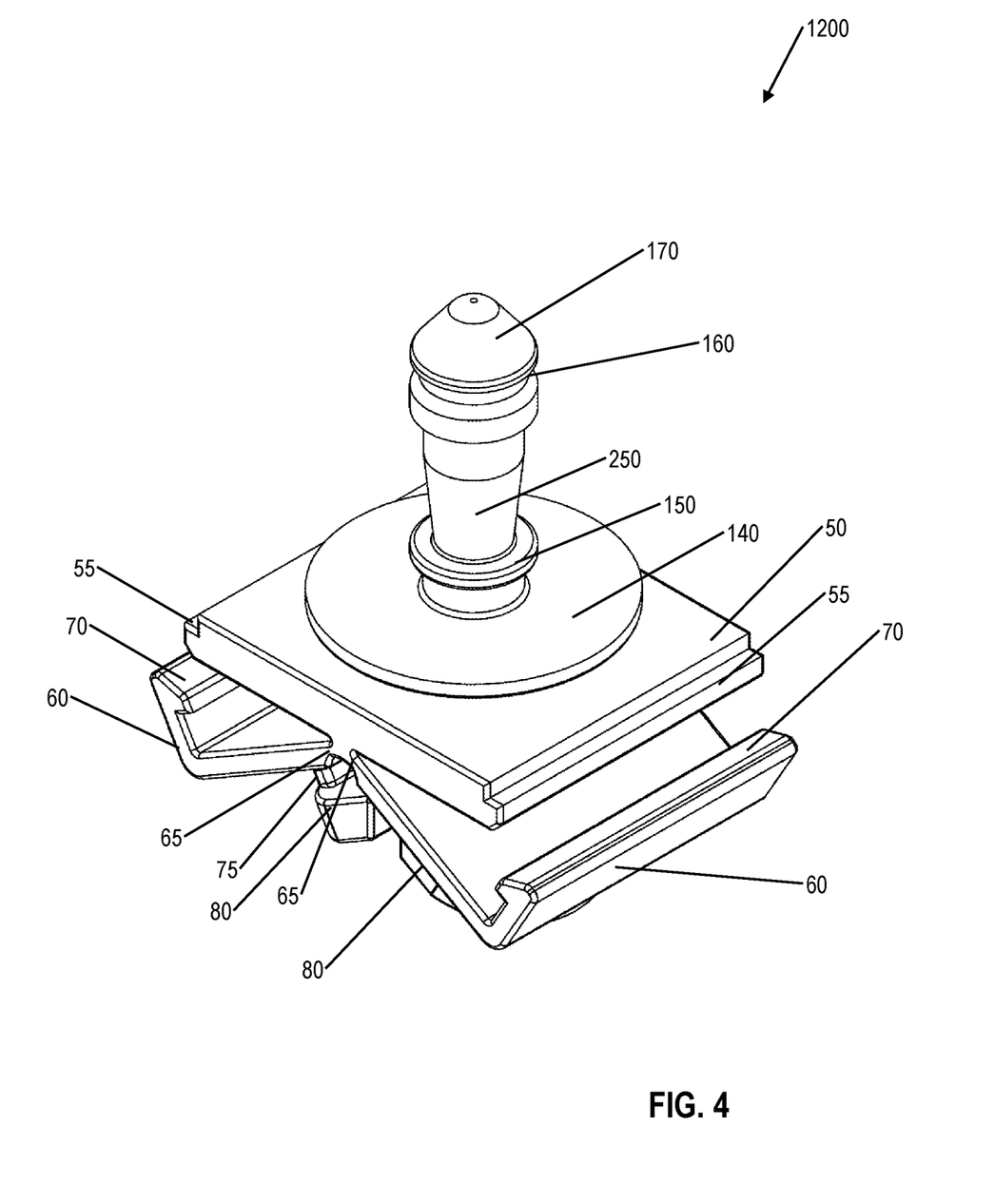
FIG. 4 is a view of a pin of a fastener clip assembly with a locking panel attachment, in accordance with some embodiments.

FIG. 4 is a view of a pin of a fastener clip assembly with a locking panel attachment, in accordance with some embodiments.

Figure 5:
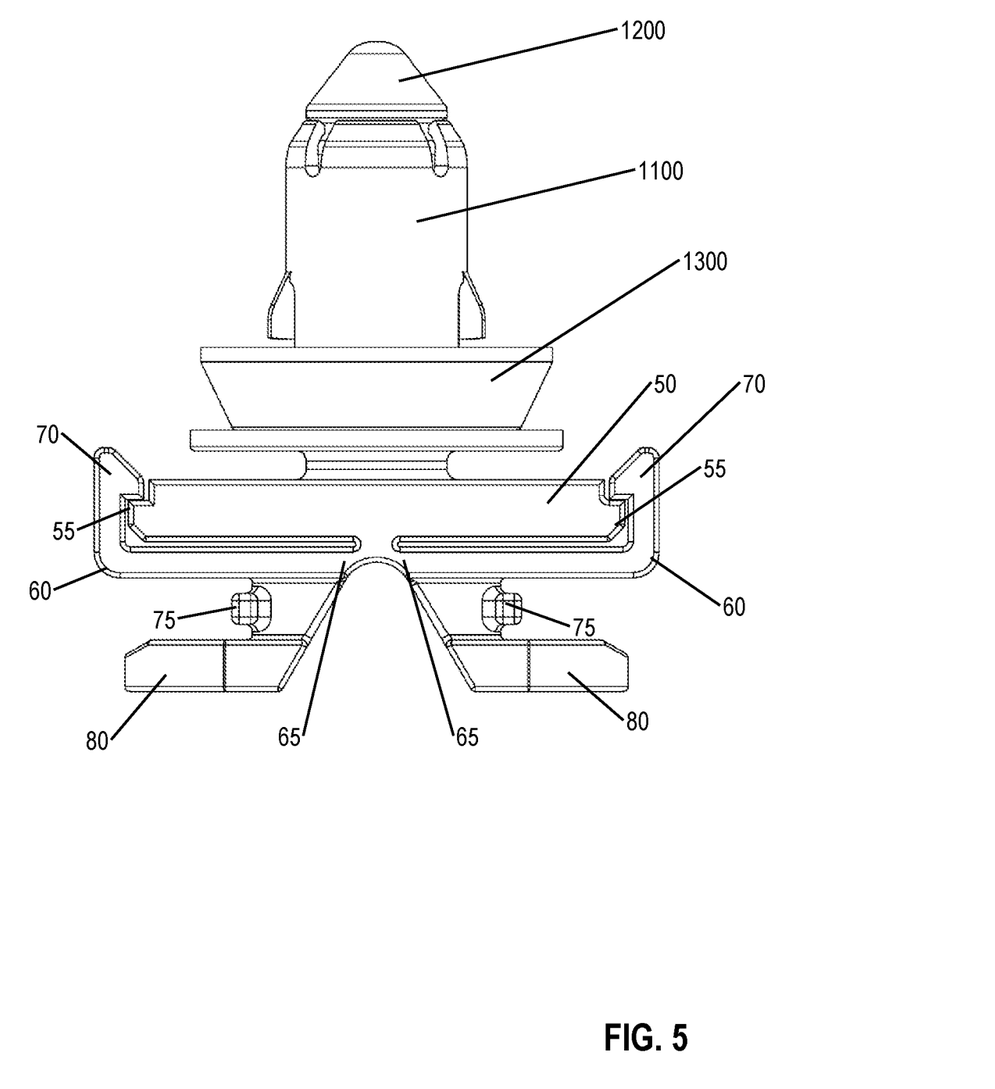
FIG. 5 is a view of a fastener clip assembly in locked position, in accordance with some embodiments.

FIG. 5 is a view of a fastener clip assembly in locked position, in accordance with some embodiments.

As was previously noted, the pin/cap shown here is only one example of a structure/method to couple the fastener clip to the chassis.

Pin 1200 is configured to engage and lock itself into cap 1100. Pin 1200, in some embodiments, comprises pin head 170, which is tapered and is configured to guide the pin into the cap. A bottom surface 160 of the pin head 170 is configured to engage the top of crown portions 110 of cap 1100 and to lock against them in order to prevent easy removal of the pin from the cap.

A removable seal may be configured to slide over pin 1200 through rim 250. In some embodiments, the removable seal may be secured between base disk 140 and seal retainer 150.

In some embodiments, pin 1200 is configured to be pressed into and be coupled to a slot in doghouse 1450 of panel 1400. A pair of locking arms 60 is coupled to platform 50 via a pair of living hinges 65. Living hinges 65 are configured to facilitate a rotation of locking arms 60 relative to platform 50. In other embodiments, other types of hinges may also be used. In some embodiments, living hinges 65 may be stronger and more reliable based at least upon the living hinges 65 extending across the width of platform 50.

Each of the pair of locking arms 60 is coupled to one of a pair of feet 80 whereby feet 80 are configured to rotate/move with locking arms 60 to which they are coupled.

In some embodiments, pin 1200 may be configured to be coupled to a slot in a doghouse in a panel. In some embodiments, during insertion of the pin into the panel slot the locking arms 60 are in an unlocked, down position. As such, by being in the unlocked, down position, feet 80 are configured to fit through the slot as pin 1200 is being inserted into a slot in the doghouse. As the pin 1200 is lowered into the slot, the bottom sides of locking arms 60 are configured to come into contact with the top surface of the doghouse thereby causing locking arms 60 to be pushed up toward a locked position. The pair of hooks 70 are configured to engage corresponding lips 55 on platform 50 thereby coupling locking arms 60 to platform 50.

In some embodiments, the slot in the doghouse and the locking assembly at the bottom of the pin facilitate easier initial assembly as a user or a robot initially attaching the pin to the doghouse may do so by directly pushing the pin into the slot in the doghouse compared to other configurations that may require additional motions to complete initial assembly.

In the locked position, feet 80, by rotating with locking arms 60 and by already being inside the slot in the doghouse, are configured to engage the bottom of a slot in the doghouse of a panel, thereby coupling pin 1200 to the panel.

In some embodiments, pin 1200 may be configured to float within the slot in the doghouse. Some float may be beneficial, for example, to allow for some non-precise alignment between the slot in the doghouse and the slot in the chassis due to inconsistencies in manufacturing, for example.

In some embodiments, a pair of spring fingers 75 between each of locking arms 60 and feet 80 such that spring fingers 75 may be inside the slot when pin 1200 is in its locked position. Spring fingers 75 may be configured to spring-push the fastener assembly against the inner walls of the doghouse slot. In some embodiments, spring fingers 75 are configured to provide spring action between pin 1200 and the inner walls of the slot such that the pin remains centered over the slot while concurrently providing some float for pin 1200 in the slot. As such, during insertion, pin 1200 has the highest chance of being center over the appropriate slot while still providing some float as needed.

In some embodiments, the fastener clip may be manufactured with injection molding using materials such as plastic nylon, polyoxymethylene (POM, also known as acetal), ABS, Polypropylene, rubber materials of various hardness, etc. It should be noted that different materials may be used for the different parts of the fastener clip.

Figure 6:
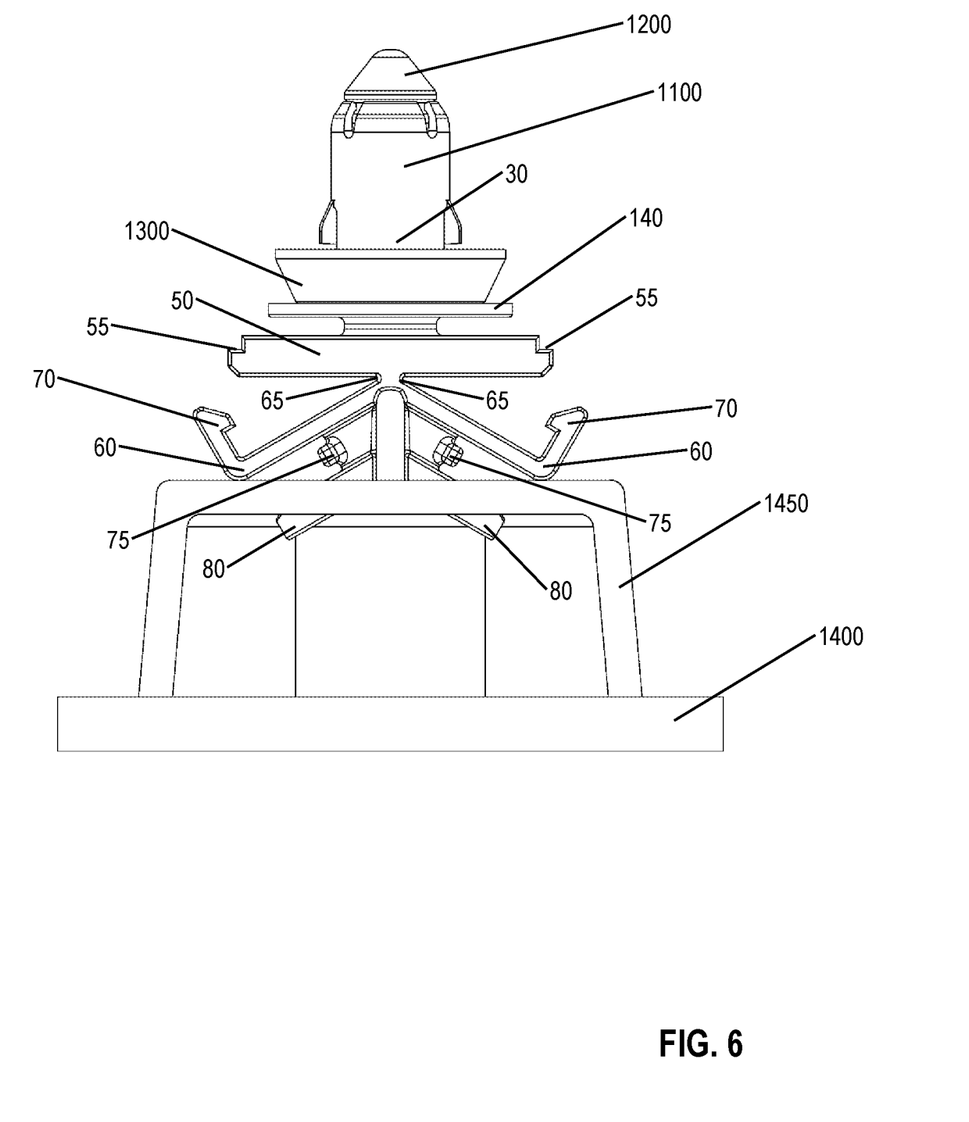
FIG. 6 is an assembled view of a fastener clip assembly prior to engaging a panel, in accordance with some embodiments.

FIG. 6 is an assembled view of a fastener clip assembly prior to engaging a panel, in accordance with some embodiments.

Figure 7:
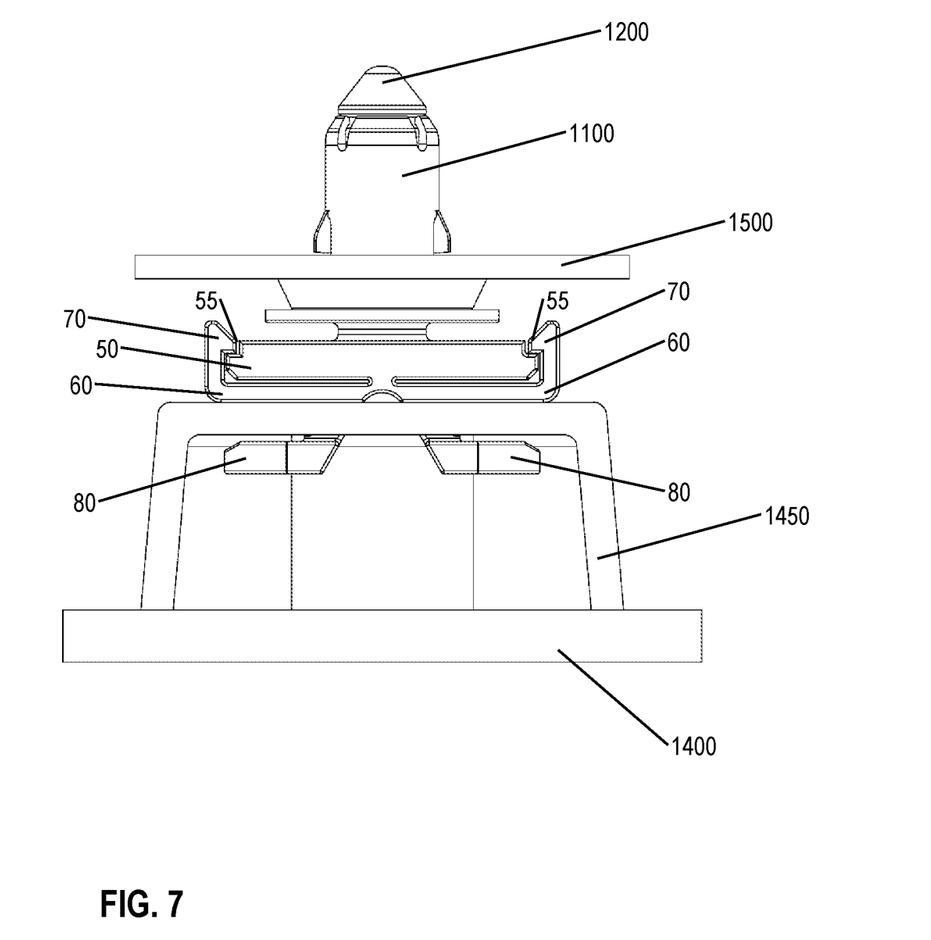
FIG. 7 is an assembled view of a fastener clip assembly in an engaged position on a panel, in accordance with some embodiments.

FIG. 7 is an assembled view of a fastener clip assembly in an engaged position on a panel, in accordance with some embodiments.

FIG. 6 shows the process of inserting the base of pin 1200 into the doghouse 1450 of panel 1400. Locking arms 60 are in the open position to facilitate the initial insertion of the pin into the slot. For example, in the open position feet 80 are configured to fit into a slot in the doghouse. Then as the pin is being pushed into the slot, the bottom surface of platform 50 is configured to engage the top of the doghouse, thereby pushing the locking arms 60 into a locked position.

FIG. 7 shows the bottom of the pin coupled onto a slot in doghouse 1450 of panel 1400.

In the locked position, feet 80 are in an expanded position engaging the bottom of doghouse thereby preventing the pin from separating from the doghouse. Hooks 70 are configured to engage lips 55 on platform 50, thereby maintaining the coupling of the pin to the doghouse.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip comprising:
a top portion, wherein the top portion is configured to be coupled to a chassis,
a bottom portion, wherein the bottom portion comprises:
a platform;
at least a pair of locking arms coupled to the platform via a pair of hinges, wherein the hinges are configured to facilitate a relative rotation between the locking arms and the platform;
at least a pair of feet coupled to the locking arms and being configured to rotate with the locking arms,
wherein the feet are configured to be partially inserted into a slot in a doghouse and, based at least on the locking arms being rotated, the feet are configured to rotate into the slot in the doghouse and to couple the bottom portion to the doghouse,
wherein the locking arms are configured to be rotated based at least on the locking arms engaging a top surface of the doghouse as the fastener clip is pushed into the slot in the doghouse,
wherein the locking arms are configured to be coupled to the platform at the end of the rotation.

2. The fastener clip of claim 1, wherein the pair of hinges are a pair of living hinges.

3. The fastener clip of claim 2, wherein the pair of living hinges is made of a same material as the platform and the pair of locking arms.

4. The fastener clip of claim 1, wherein the bottom portion comprises a pair of spring fingers between the pair of locking arms and the pair of feet, wherein the pair of spring fingers is configured to maintain the fastener clip centered over the slot in the doghouse based at least upon the pair of spring fingers being configured to spring-push against the sides of the slot in the doghouse.

5. The fastener clip of claim 4, wherein the spring fingers are configured to facilitate a certain amount of float between the fastener clip and the doghouse based at least upon a spring action of the spring fingers.

6. The fastener clip of claim 1, wherein the pair of locking arms comprises a pair of hooks configured to lock the locking arms to the platform based at least upon the pair of hooks being configured to engage a corresponding pair of lips on the platform.

7. The fastener clip of claim 6, wherein the pair of locking arms and the corresponding pair of lips extend across a width of the platform.

8. A fastener clip assembly comprising:
a chassis;
a doghouse comprising a slot;
a fastener clip comprising:
a top portion, wherein the top portion is configured to be coupled to the chassis,
a bottom portion, wherein the bottom portion comprises:
a platform;
at least a pair of locking arms coupled to the platform via a pair of hinges, wherein the hinges are configured to facilitate a relative rotation between the locking arms and the platform;
at least a pair of feet coupled to the locking arms and being configured to rotate with the locking arms,
wherein the feet are configured to be partially inserted into the slot in the doghouse and, based at least upon the locking arms being rotated, the feet are configured to rotate into the slot in the doghouse and to couple the bottom portion to the doghouse,
wherein the locking arms are configured to be rotated based at least on the locking arms engaging a top surface of the doghouse as the fastener clip is pushed into the slot in the doghouse,
wherein the locking arms are configured to be coupled to the platform at the end of the rotation.

9. The fastener clip assembly of claim 8, wherein the pair of hinges are a pair of living hinges.

10. The fastener clip assembly of claim 9, wherein the pair of living hinges is made of a same material as the platform and the pair of locking arms.

11. The fastener clip assembly of claim 8, wherein the bottom portion comprises a pair of spring fingers between the pair of locking arms and the pair of feet, wherein the pair of spring fingers is configured to maintain the fastener clip centered over the slot in the doghouse based at least upon the pair of spring fingers being configured to spring-push against the sides of the slot in the doghouse.

12. The fastener clip assembly of claim 8, wherein the spring fingers are configured to facilitate a certain amount of float between the fastener clip and the doghouse based at least upon a spring action of the spring fingers.

13. The fastener clip assembly of claim 8, wherein the pair of locking arms comprises a pair of hooks configured to lock the locking arms to the platform based at least upon the pair of hooks being configured to engage a corresponding pair of lips on the platform.

14. The fastener clip assembly of claim 13, wherein the pair of locking arms and the corresponding pair of lips extend across a width of the platform.

* * * * *